Oct. 20, 1936.    H. R. GUNDLACH    2,057,678
ROOFING GRANULE AND METHOD OF COLORING SAME
Filed March 21, 1935
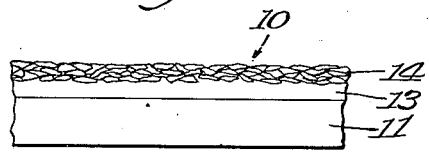
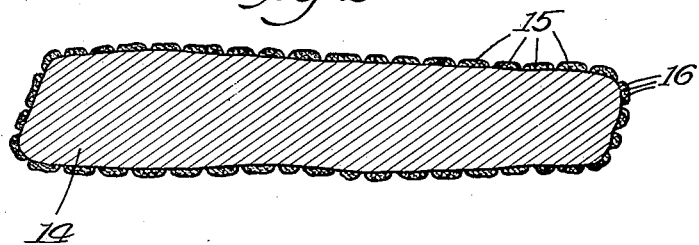
Inventor
Henry R. Gundlach
By Gillson, Mann & Cox Attys.

Patented Oct. 20, 1936

2,057,678

UNITED STATES PATENT OFFICE 2,057,678

ROOFING GRANULE AND METHOD OF COLORING SAME

Henry R. Gundlach, Baltimore, Md., assignor to Central Commercial Company, a corporation of Illinois Application March 21, 1935, Serial No. 12,235

28 Claims. (Cl. 91—68)

This invention relates to roofing material, and, more particularly, to colored granules for use on composition roofing and the like, and the method of preparing the same.

The principal object of the invention is the provision of a new and improved colored granule for use on composition roofing and the like.

A further object of the invention is the provision of a new and improved binder for attaching color pigment to the surface of granules that is inexpensive, easily prepared and applied, permanent in character and which will not affect the brilliancy of or be seriously affected by sun or weather conditions.

Another object of the invention is the provision of a new and improved process for attaching color pigment to the surface of granules for use on composition roofing.

A still further object of the invention is the provision of a new and improved method of preparing a binder for attaching color pigment to the surface of roofing granules.

Another object of the invention is the provision of new and improved granules for composition roofing in which the color pigment is applied to the surface of the granule by a binder, the material of which for the most part is widely distributed and inexpensive, and that when applied is permanent in character and not affected by climatic conditions.

Other and further objects and advantages of the invention will appear from the following descriptions taken in connection with the accompanying drawing, in which:—

Fig. 1 is an edge view of a portion of roofing material with parts broken away; and Fig. 2 is a section through one of the granules on an enlarged scale.

Referring now to the drawing, the reference character 10 designates a portion of a strip of roofing material which comprises the base or foundation felt 11, which is impregnated with waterproofing composition, such as bituminous material, and on the upper surface of which is a coat 13 of asphaltic material of relatively high melting point, and in which the roofing granules 14 are partially embedded. A coat or binder 15 secures color pigment 16 to the surface of the granule for coloring the same.

The granules are of any suitable material, such as slate, quartz, shale, trap rock and the like, and may be prepared in any suitable manner, as by grinding the material and screening the same to required dimensions, as is usual in the preparation of granules for use on composition roofing.

Since slate is opaque and laminated, granules made from the same are flat and in position of use lie more or less closely together and overlap in such a manner that they protect the asphaltic binder and saturant therebeneath from the actinic rays of the sun. Flat granules are not so likely to become detached in the handling of the roofing or walking over the completed roof as are granules of the more nearly globular form. Moreover, since the binder for the color pigment adheres more firmly thereto than on the other type, slate granules are admirably adapted for use on roofs of composition material. Certain types of granules are of natural colors, while it is necessary to apply color pigment or coloring matter to others to impart to them the desired color.

While granules of different natural colors are employed, as a rule, the colors are not brilliant or permanent, and, in many instances, soon fade when exposed to the weather.

It has been proposed in coloring granules to employ color pigment and to secure the pigment to the surface of the granules by a suitable binder. Among the various binders that have been proposed, a large percentage are more or less soluble or have little-weather resisting qualities, or are brittle. None of these mentioned have been commercially successful for one reason or another. The present invention seeks to remedy these defects by the provision of a binder or cement that is insoluble, wear-resistant and which does not require a very high temperature in the application thereof.

In the preparation of the binder or cement powder and the application of color pigment to the granules by means of this cement or binder, a composition including calcareous, aluminous and siliceous materials, or any two of the same is first prepared, mixed with color pigment, applied to the granules, and then treated with a phosphate, such as hydrogen phosphate (phosphoric acid), to form a weather-proof insoluble binder or cement 14 on the surface of the granules for retaining the color pigment 15 thereon. While the cement or binder 14 and the color pigment will be referred to as a coat or color coat, the microscope appears to indicate that the coat is not continuous over the entire surface but in the form of separate, minute spots, as indicated on an enlarged scale in Fig. 2.

The binder or cement powder may be prepared by calcining or sintering a mixture of compounds containing calcium, aluminum and silicon or compounds containing any two of these classes or compounds containing any two of these classes of compositions that will react with phosphoric acid to form an insoluble phosphate binder. As examples, the oxide, hydroxide or carbonate of calcium may be used. The oxide or hydroxide of aluminum and the oxide of silicon may also be employed. Silicates of aluminum, such as clay and the like, may also be used in the preparation of the cement powder.

The sintering or calcining of the material is accomplished under ordinary circumstances by subjecting the same, for example, to a temperature of from 1900° F. to 2300° F. for eight to ten hours or of from 2100° to 2400° F. for a period of from four to eight hours.

If calcium and silicon compounds alone are used, higher temperatures are required because the mass must be heated to, or near, the melting point of the silica in order that the silica and calcium oxide combine. As a matter of practice, the calcium silicate, having the formula CaO.SiO2 is the only calcium silicate that is practical to be used. Where an excess of calcium is used, the resulting silicate having the formula 3CaO.SiO2 is not practical, because, when mixed with phosphoric acid, it sets too rapidly. It might, however, be practical if used under certain conditions, as, for instance, during cold weather when the reaction is retarded.

It is not known what compositions are formed during the sintering or calcining process, and without limiting the invention to any theory as to the reactions that take place, it may be stated that it is probable that the double silicates of calcium and aluminum are formed when compounds of all three of the classes above are used, possibly together with silicates of calcium and also those of aluminum. Calcium aluminate may also be formed, but in any event the calcined or sintered material, after being reduced to powder, forms, with the addition of a soluble phosphate, such as ortho-phosphoric acid, a cement that sets, is insoluble and that is capable of retaining color pigment on the surface of the granules.

The setting of the cement may be retarded, if desired, by the addition of a small percentage of compounds of zinc or aluminum, such as the oxides or hydroxides of either or both of these metals. Preferably, though not necessarily, the oxides are employed and are dissolved in the acid before the same is mixed with cement powder.

Fluxes may also be used with the material during the sintering or calcining processes, if desired. Fluorides, such as calcium fluoride (CaF), sodium silico-fluoride (NaSiF6) and cryolite (Na3AlF6) give satisfactory results. Cryolite not only functions as a flux and lowers the sintering or melting points of the material, but also appears to enter into a composition with the other materials to improve the qualities of the cement powder.

The compositions that follow and proportions of ingredients, together with the method of treating the same, have been found in practice to give satisfactory results, and are here given by way of examples only. These materials not only give results that are satisfactory, but since they are readily obtained at a low price and are plentiful almost anywhere, the cost of producing the cement powder is reduced to a minimum.

In the preparation of the cement powder, each of the following formulas has been found by experiment to give satisfactory results:—

*Formula No. 1*

| | Per cent |
|---|---|
| Clay | 72 |
| Calcium carbonate | 28 |

*Formula No. 2*

| | Per cent |
|---|---|
| Clay | 69.8 |
| Calcium carbonate | 27.2 |
| Cryolite | 3.0 |

*Formula No. 3*

| | Per cent |
|---|---|
| Calcium carbonate | 48.0 |
| Aluminum oxide | 52.0 |

*Formula No. 4*

| | Per cent |
|---|---|
| Sodium silico-fluoride | 36.4 |
| Calcium fluoride | 5.1 |
| Aluminum oxide | 32.4 |
| Silica | 26.1 |

*Formula No. 5*

| | Per cent |
|---|---|
| Calcium carbonate | 16 to 17 |
| China clay | 83 to 84 |

Formula No. 2 gives excellent results and since the cement powder from this material may be prepared at a minimum of expense, it has been found to be satisfactory in use on a production scale.

After the material has been sintered or calcined, the same is reduced to a fine powder or pulverized in a ball-mill or any other suitable mechanism. For instance, it may be reduced to such an extent that it will pass a 200-mesh screen and, preferably, to such an extent that 90% will pass a 325 mesh screen.

In applying the color pigment to the surface of the granules, the powder and the pigment, together with fillers, if any are used, are thoroughly mixed in a suitable mixing machine, after which the mass is mixed with granules, and is then ready for the application of the phosphate and the retarder, if a retarder be used. The granules are normally slightly moist and thus the powdered cement and pigment will adhere to the surface thereof during the mixing operation. The water, acid and retarder, if used, having been previously mixed are now applied to the mass of granules and thoroughly mixed.

The following formulas have been found to give satisfactory results:—

*Formula No. 1*

| | Pounds |
|---|---|
| Cement powder | 12 |
| Pigment | 10 to 25 |
| Filler, if desired, possibly as much as 15 lbs.—silica | |
| Phosphoric acid 75% | 32.4 |
| Zinc oxide | 1.2 |
| Water | 22.4 |

*Formula No. 2*

| | Pounds |
|---|---|
| Cement powder | 9 |
| Pigment | 10 to 20 |
| Filler, if desired | |
| Phosphoric acid 75% | 22.1 |
| Zinc oxide | .9 |
| Water | 26. |

After the materials are thoroughly mixed, the same is dried, and simultaneously agitated to prevent agglomeration. In drying the granules, they may be passed through a rotary kiln, which has its temperature so adjusted that the temperature of the mass will be slowly increased, for example, to about 200° to 300° F., or to about 380° or 400° F., and are then discharged from the kiln. When the heat is carried to the higher temperature indicated the drying time is usually from twenty to thirty minutes. After the addition of the acid, and prior to the drying operation, the granules may, if desired, be heated to a temperature of 140° to 160° F. for ten minutes to complete the setting of the cement, and to prevent agglomeration of the granules during this step the mass is preferably agitated.

Instead of using the compounds of calcium, the oxides, hydroxides or carbonates of the remaining members of the calcium family—namely, barium and strontium—may be substituted in molecular equivalent amounts.

Dolomite, or the oxides, hydroxide or carbonates of magnesium may also be substituted in molecular equivalent amounts in whole or in part for the lime in the preparation of the cement. If magnesium be substituted for calcium, it will require higher temperatures for sintering the magnesium compositions in forming the cement. A small proportion of zinc oxide may be substituted for molecular equivalent amounts of lime in the preparation of the calcined material. A satisfactory cement is produced by substituting ferric oxide in molecular equivalent amounts for the alumina. The cement is, of course, brown in color, but this is not objectionable when used with red or brown color pigment in coloring the granules.

Instead of forming calcium aluminate or the silicates of calcium and aluminum by calcination, they may be prepared by wet methods. For instance, aluminum silicate made by treating aluminum nitrate with sodium silicate, the composition washed, filtered and dried at about 325° F., then ground and finally mixed with aluminum oxide and 52% ortho-phosphoric acid ($H_3PO_4$), to which aluminum phosphate is added, sets sufficiently well that it may be used as cement powder, although the product is not as satisfactory as when the cement powder is made from sintered or calcined material. In fact, any silicate that will set with phosphoric acid and react therewith to form an insoluble binder, as calcium, aluminum, zinc and the like, however prepared, may be used.

The term "calcined" employed in the following claims is intended to include the heat treatment given the cement material whether the same is entirely or partially fused during the operation.

In the preparation of the granules on a production scale, it is more practical to use the phosphate of hydrogen such as ortho-phosphoric acid, or a mixture of ortho-phosphoric and meta-phosphoric acid is preferably used, and, in practice a 75% solution of phosphoric acid gives satisfactory results.

This is a continuation in part of my application, Serial No. 671,201, filed May 15, 1933.

It is thought from the foregoing taken in connection with the accompanying drawing that the method and process of my invention will be apparent to those skilled in the art, and that changes may be made without departing from the spirit and scope of the appended claims.

I claim as my invention:—

1. A granule suitable for use on composition roofing comprising a granule of mineral matter, colored by color pigment attached to the surface of the granule by a binder comprising the reaction product of a calcined composition of siliceous and calcareous material and phosphoric acid.

2. A method of coloring granules suitable for use on composition roofing comprising calcining a mixture of siliceous, argillaceous and calcareous materials, reducing the mass to powder, mixing the mass with color pigment and phosphoric acid and applying the same to the surface of the granules.

3. A method of coloring granules of mineral matter suitable for use on composition roofing which comprising attaching color pigments to the surface of the granules with a weatherproof cement comprising a mixture of calcined china clay and cryolite and phosphoric acid.

4. A method of coloring granules of mineral matter suitable for use on composition roofing which comprises mixing together a calcined ground mixture of china clay, calcium carbonate and cryolite, mixing the ground mass with granules, color pigment, zinc oxide, phosphoric acid and water, agitating the mass and drying the same.

5. A method of forming a cement for use in binding color pigment to the surface of granules and the like which comprises mixing ground china clay, calcium carbonate and cryolite, calcining the mixture at a temperature of from 2100° to 2300° F. for from six to eight hours, grinding the mass to an impalpable powder and mixing said powder with color pigment, zinc oxide, phosphoric acid and water.

6. A method of coloring roofing granules of mineral matter which consists in mixing the following ingredients in approximately the proportions indicated:

1 ton granules
8½ lbs. china clay           } calcined
3¼ lbs. calcium carbonate}
.36 cryolite
12 to 20 lbs. color pigment
32.4 lbs. phosphoric acid 75%
1.2 lbs. zinc oxide
22 to 25 lbs. water 7. A process of coloring granules which comprises forming a cement powder by calcining china clay, cryolite and calcium carbonate, reducing the mass to a fine powder, thoroughly mixing the same with color pigment, and then adding approximately 12 lbs. of the mixture to each ton of granules, mixing the mass, and then adding approximately 32.4 lbs. of phosphoric acid 75%, approximately 1.2 lbs. zinc oxide and approximately 22 to 25 lbs. water.

8. A method of coloring roofing granules which consists in providing a cement powder formed from a mixture of:—

| | Percent |
|---|---|
| China clay | 69.8 |
| Calcium carbonate | 27.2 |
| Cryolite | 3.0 | that has been calcined at a temperature from 2100° to 2300° F. for from six to eight hours, and reduced to a fineness that 95% thereof will pass through a 325-mesh sieve, mixing 12 to 20 lbs. of color pigment with 12 lbs. of the cement powder, mixing the mass with a ton of granules, and then adding 32.4 lbs. phosphoric acid 75%, 1.2 lbs. of zinc oxide and 22 to 25 lbs. water, and finally drying the granules, and simultaneously agitating the same to prevent agglomeration.

9. A granule suitable for use on composition roofing comprising a granule of mineral matter, colored by color pigment attached to the surface of the granule by a binder comprising the reaction product of an aluminous and calcareous material and phosphoric acid.

10. A granule suitable for use on composition roofing comprising a granule of mineral matter, colored by color pigment attached to the surface of the granule by a binder comprising the reaction product of a calcined composition of siliceous and aluminous material and phosphoric acid.

11. Granular material adapted to be used as a weather protecting coat for composition roofing comprising granules of mineral matter, each having color pigment secured to its surface by a binder comprising an insoluble phosphate having the properties of a binder formed by the reaction of phosphoric acid on a silicate.

12. A method of coloring granules of mineral matter for use on composition roofing which comprises attaching color pigment to the surface of granules with a weatherproof cement comprising the reaction products of phosphoric acid and a composition including compounds of calcium, aluminum and silicon.

13. A method of coloring granules of mineral matter for use on composition roofing which comprises forming a cement powder of the oxides of aluminum and calcium, mixing color pigment with the powder, mixing the powder with roofing granules and treating the mixture with a soluble phosphate to form a substantially insoluble phosphate cement on the surfaces of the granules.

14. Granular material adapted to be used as a weather protecting coat for composition roofing comprising granules of mineral matter, each having a colored coat on its exterior comprising color pigment and the reaction product of a soluble phosphate and a composition containing aluminum and a member of the calcium group.

15. Granular material adapted to be used as a weather protecting coat for composition roofing comprising granules of mineral matter, each having a colored coat on its exterior comprising color pigment and the reaction product of a soluble phosphate and a composition containing silica and a member of the calcium group.

16. A method of coloring granules suitable for use on composition roofing which comprises attaching color pigment to the surface of the granules which comprises mixing the granules with color pigment and material containing at least one ground substantially insoluble silicate, then adding phosphoric acid, agitating, and finally drying the mass.

17. A method of coloring granules suitable for use on composition roofing comprising mixing granules, color pigment and ground material containing calcium aluminate, adding a phosphoric acid, agitating, and finally drying the mass.

18. Granular material adapted to be used as a weather protecting coat for composition roofing comprising granules of mineral matter, each having a colored coat on its exterior comprising color pigment and the reaction product of phosphoric acid on a ground mass of calcined lime and ferric oxide.

19. A method of coloring granules of mineral matter suitable for use in composition roofing and the like which consists in treating the granules with compositions comprising calcined china clay, phosphoric acid and color pigment, heating the mass and simultaneously agitating the same to prevent agglomeration.

20. In composition roofing having a felt foundation impregnated with a waterproofing composition, granules attached to one surface of said felt, said granules each comprising a particle of mineral matter having color pigment attached to the surface thereof by a cement comprising the reaction products of an insoluble silicate and phosphoric acid.

21. Composition roofing material comprising a foundation felt impregnated with a bituminous compound, granules secured to one side of said felt, each of said granules having color pigment secured to the surface thereof by a binder comprising the reaction product of phosphoric acid on calcined mineral matter that will react with phosphoric acid to form insoluble cementitious material, said material comprising a substantially insoluble phosphate composition.

22. A method of coloring roofing granules which comprises mixing said granules with color pigment and a calcined pulverized mixture of lime and china clay, then mixing orthophosphoric acid and water with the mass, applying heat to set the mixture and simultaneously preventing agglomeration of the particles and then applying heat from 220° to 300° F. for drying the mass.

23. A method of coloring roofing granules which comprises mixing china clay and lime, calcining the mixture at a temperature of from 1900° to 2300° F., grinding the calcined mixture, mixing granules and color pigment with the ground mixture, adding to the mixture orthophosphoric acid and water and finally applying heat for setting the mixture and simultaneously agitating the same to prevent agglomeration of the granules and finally applying heat to dry the mass.

24. A process of coloring roofing granules which comprises mixing granules of mineral matter with color pigment and a calcined pulverized composition of clay and an oxide of the calcium group, adding to the mixture phosphoric acid and water, applying heat for setting the coating material and simultaneously agitating the mass to prevent agglomeration, and finally applying heat to dry the mass.

25. A granular material for use on composition roofing consisting of mineral granules covered with a colored coating material possessing the characteristics of a product obtained by mixing granules with color pigment and a calcined pulverized mixture of clay and lime, orthophosphoric acid and water, applying heat to set the mixture, agitating the mass to prevent agglomeration, and finally applying heat for drying the mass.

26. Granular material adapted to be used as a weather protecting coat for composition roofing comprising granules of mineral matter, each having a colored coat on its exterior comprising color pigment and a reaction product of compounds including clay, a compound of the calcium group and phosphoric acid.

27. An artificially colored granule for use in composition roofing comprising a particle of mineral matter coated with the reaction product of orthophosphoric acid on calcined lime and clay.

28. Composition roofing material comprising a foundation felt, impregnated with waterproofing composition and having colored granules secured to one side thereof, each granule comprising a particle of mineral matter having color pigment secured to the surface thereof by a cement comprising the reaction product of phosphoric acid and a prepared composition of clay and a compound of the calcium group.

HENRY R. GUNDLACH.